(12) United States Patent
Luthra et al.

(10) Patent No.: US 11,025,883 B2
(45) Date of Patent: *Jun. 1, 2021

(54) METHODS AND APPARATUS FOR 3DTV IMAGE ADJUSTMENT

(71) Applicant: Google Technology Holdings LLC, Mountain View, CA (US)

(72) Inventors: Ajay K. Luthra, San Diego, CA (US); Michael A. Grossman, San Diego, CA (US); Jae Hoon Kim, San Diego, CA (US); Arjun Ramamurthy, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/544,444

(22) Filed: Aug. 19, 2019

(65) Prior Publication Data

US 2020/0045291 A1 Feb. 6, 2020

Related U.S. Application Data

(63) Continuation of application No. 15/173,204, filed on Jun. 3, 2016, now Pat. No. 10,389,998, which is a (Continued)

(51) Int. Cl.
*H04N 13/167* (2018.01)
*H04N 13/261* (2018.01)
*H04N 13/398* (2018.01)

(52) U.S. Cl.
CPC ......... *H04N 13/167* (2018.05); *H04N 13/261* (2018.05); *H04N 13/398* (2018.05)

(58) Field of Classification Search
CPC .......................... H04N 13/261; H04N 13/167
See application file for complete search history.

(56) References Cited

U.S. PATENT DOCUMENTS 6,477,267 B1 11/2002 Richards
6,496,598 B1 12/2002 Harman
(Continued)

OTHER PUBLICATIONS

Notice of Allowance dated Mar. 3, 2016 in U.S. Appl. No. 13/343,368.
(Continued)

*Primary Examiner* — Rowina J Cattungal
(74) *Attorney, Agent, or Firm* — Byrne Poh LLP

(57) ABSTRACT

A method (300) and apparatus (400) for three-dimensional television (3DTV) image adjustment includes loading (342, 344) default 2D-to-3D image setting values from a default settings memory to a user adjustment settings memory, annunciating (346) the default 2D-to-3D image setting values, receiving (361, 362) a 2D-to-3D image settings value adjustment, saving (370) the 2D-to-3D image settings value adjustment in the user adjustment settings memory, and applying (390) the 2D-to-3D image settings value adjustment to a 2D-to-3D converted image. These methods and apparatuses allow individual users to set 3DTV image settings to their personal preferences to compensate for brightness reductions caused by 3DTV glasses, depth perception sensitivities, and other image quality factors.

18 Claims, 4 Drawing Sheets

Related U.S. Application Data continuation of application No. 13/343,368, filed on Jan. 4, 2012, now Pat. No. 9,386,294.

(60) Provisional application No. 61/429,906, filed on Jan. 5, 2011.

(56) References Cited

U.S. PATENT DOCUMENTS

| | | | |
|---|---|---|---|
| 7,551,770 B2 | 6/2009 | Harman | |
| 7,999,844 B2 | 8/2011 | Richards | |
| 2005/0259147 A1* | 11/2005 | Nam | H04N 21/2343 348/43 |
| 2010/0080448 A1* | 4/2010 | Tam | G06T 7/50 382/154 |
| 2010/0111417 A1* | 5/2010 | Ward | G06T 7/579 382/173 |
| 2011/0012990 A1* | 1/2011 | Broberg | H04N 13/161 348/43 |
| 2011/0032338 A1* | 2/2011 | Raveendran | H04N 21/43615 348/51 |
| 2011/0085023 A1* | 4/2011 | Hulyalkar | H04N 13/194 348/43 |
| 2011/0102554 A1* | 5/2011 | Saito | G09G 3/003 348/51 |
| 2011/0122235 A1* | 5/2011 | Lee | H04N 13/356 348/51 |
| 2011/0164034 A1* | 7/2011 | Bennett | H04N 13/139 345/419 |
| 2011/0175988 A1 | 7/2011 | Luthra et al. | |
| 2012/0038745 A1* | 2/2012 | Yu | H04N 13/128 348/46 |
| 2012/0136612 A1* | 5/2012 | Vanderhoff | H04N 5/765 702/119 |
| 2012/0162363 A1 | 6/2012 | Huang et al. | |
| 2012/0162663 A1* | 6/2012 | Kapner | G01D 5/38 356/499 |

OTHER PUBLICATIONS

Notice of Allowance dated Apr. 9, 2019 in U.S. Appl. No. 15/173,204.
Office Action dated Jan. 17, 2014 in U.S. Appl. No. 13/343,368.
Office Action dated Jan. 22, 2019 in U.S. Appl. No. 15/173,204.
Office Action dated Apr. 21, 2015 in U.S. Appl. No. 13/343,368.
Office Action dated Jun. 12, 2014 in U.S. Appl. No. 13/343,368.
Office Action dated Sep. 20, 2018 in U.S. Appl. No. 15/173,204.
Office Action dated Nov. 16, 2015 in U.S. Appl. No. 13/343,368.

* cited by examiner

FIG. 1: overall system diagram

100

FIG. 2: 2D-to-3D image adjustment controller

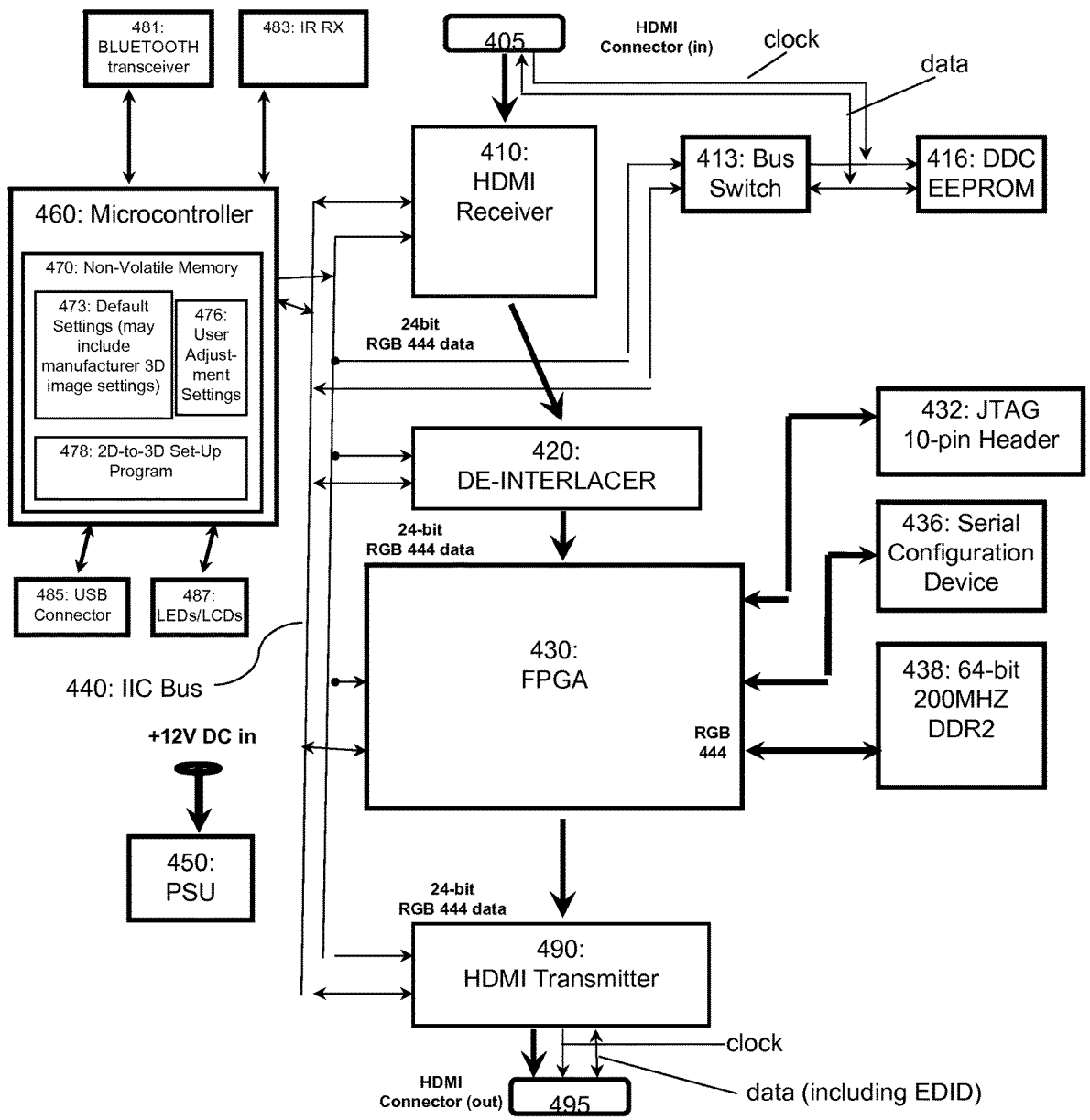
FIG. 4: 2D-to-3D converter block diagram

METHODS AND APPARATUS FOR 3DTV IMAGE ADJUSTMENT

CROSS-REFERENCE TO RELATED APPLICATIONS

This application is a continuation of U.S. patent application Ser. No. 15/173,204, filed Jun. 3, 2016, which is a continuation of U.S. patent application Ser. No. 13/343,368 filed Jan. 4, 2012, which claims the benefit of U.S. Provisional Patent Application No. 61/429,906 filed on Jan. 5, 2011, each of which is hereby incorporated by reference herein in its entirety.

BACKGROUND OF THE DISCLOSURE

Depth perception for three-dimensional television (3DTV) is provided by having two views, one for the left eye and another for the right eye, for a user. Traditionally, these two views are created when recording the video. Depth information, however, may also be artificially generated from an analysis of high-definition two-dimensional (2D) images to create left eye and right eye views. This generated depth information may be created using a post-production process in studios or head-ends, or depth information may be generated at the output of a home video device such as a set-top box or a Blu-ray Disc player.

One of the problems associated with viewing 2D-to-3D generated video is that the video seems dim because the glasses used to view 3DTV images block some of the light to a viewer's eyes (relative to a 2D viewing experience, which does not use 3DTV glasses).

Another problem associated with viewing 2D-to-3D generated video is that different viewers have different sensitivities to depth perception. For example, some viewers do not like an object coming out of the television screen close to their eyes because it strains their eyes or creates an unsettling feeling. This depth perception sensitivity may become more pronounced when 2D-to-3D program material transitions from a relatively static display to a display with high motion content or multiple scene changes. Such transitions may occur during high action sequences or at commercial breaks.

Thus, there is an opportunity to address the dimness and depth perception issues associated with 2D-to-3D generated videos and also other elements of artificially-generated 3D images. The various aspects, features and advantages of the disclosure will become more fully apparent to those having ordinary skill in the art upon careful consideration of the following Drawings and accompanying Detailed Description.

BRIEF DESCRIPTION OF THE DRAWINGS

FIG. 4 shows a schematic diagram of a 2D-to-3D converter that supports image adjustment.

Figure 1:
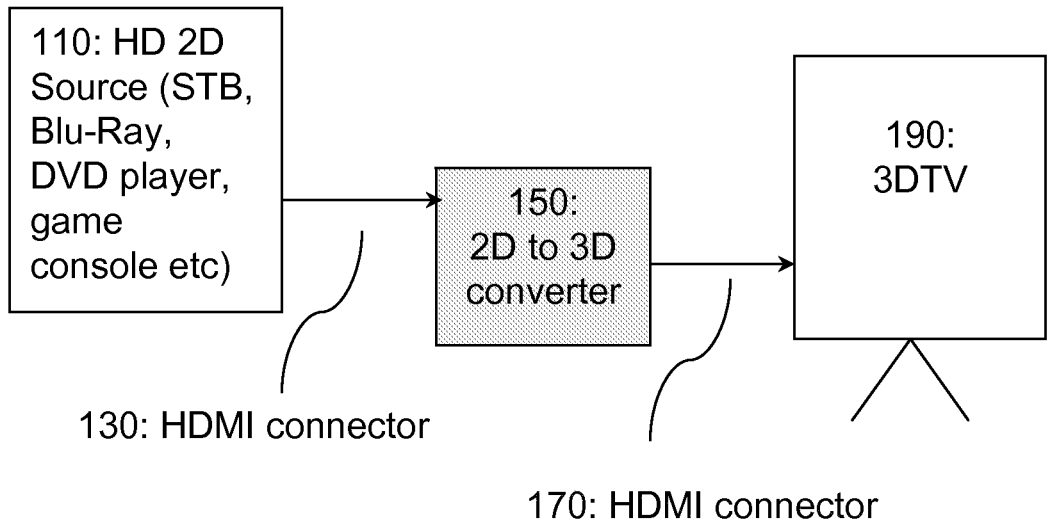
FIG. 1 shows an example schematic of a system for 2D-to-3D video generation in a home environment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method and apparatus for 3DTV image adjustment allows a user to change default image settings values for modes such as brightness, depth, contrast, and focus. The default settings may incorporate 3DTV manufacturer image settings for 3D images. The adjustments may be stored on a per-user basis and recalled when that user is viewing 2D-to-3D generated video. Thus, the viewer may have customized settings that are visually comfortable and account for a personal level of sensitivity to depth perception, brightness, and other factors that affect perceived image quality.

FIG. 1 shows an example schematic of a system 100 for 2D-to-3D video generation in a home environment. Although a home environment is assumed in FIG. 1, the environment need not be an actual home. It could also be an office, a store, or another indoor or outdoor environment. The system 100 includes a source 110 of 2D video. For higher quality 2D-to-3D conversion analysis, high-definition (HD) 2D video from a set-top box, Blu-ray Disc player, or game console is assumed. Other 2D formats may also be used, but it is possible that the conversion to 3D will have lower image quality.

The output of the HD 2D source 110, which is a high-definition 2D video signal, is coupled to an input of a 2D-to-3D converter 150. A first HDMI connector 130 is shown as a cable and an example coupler between the 2D source 110 and the 2D-to-3D converter 150. The output of the 2D-to-3D converter 150, which is a 3D video signal, is coupled to an input of a 3DTV 190. A second HDMI cable 170 is shown as an example coupler between the 2D-to-3D converter 150 and the 3DTV 190. Instead of wired HDMI connections, one or both of the HDMI cables may be wireless HDMI, or the HDMI format may be replaced with another format such as Mobile High-Definition Link (MHL).

The artificially-generated 3D video signal from the 2D-to-3D converter 150 output may compensate for the partial light blockage caused by 3DTV glasses and also implement depth perception adjustments to accommodate preferences of an individual viewer. Additional 3D image settings, such as contrast and focus (also called focal point), may also be adjusted by an individual viewer. Brightness refers to the perceived light from a displayed scene. Depth refers to 3D depth provided by a scene, which can be adjusted by changing parallax values created during the 2D-to-3D conversion process. (Adjusting artificial parallax values in a particular manner may cause the left eye view's viewpoint to shift further left and the right eye view's viewpoint to shift further right, which creates a more pronounced visual impression of depth.) Contrast refers to a ratio of luminance of a white video signal to luminance of a black video signal. And focus refers to which part of the scene goes inside the TV display and which part pops out of the TV display. From the top-to-bottom of a scene, a certain percentage of the top may seem to be behind the plane of the screen and the remaining percentage of the bottom of the scene may seem to be in front of the screen. Each of these settings, and perhaps fewer or additional settings as will be described later, may be manually adjusted by a user to suit the user's personal preferences.

Figure 2:
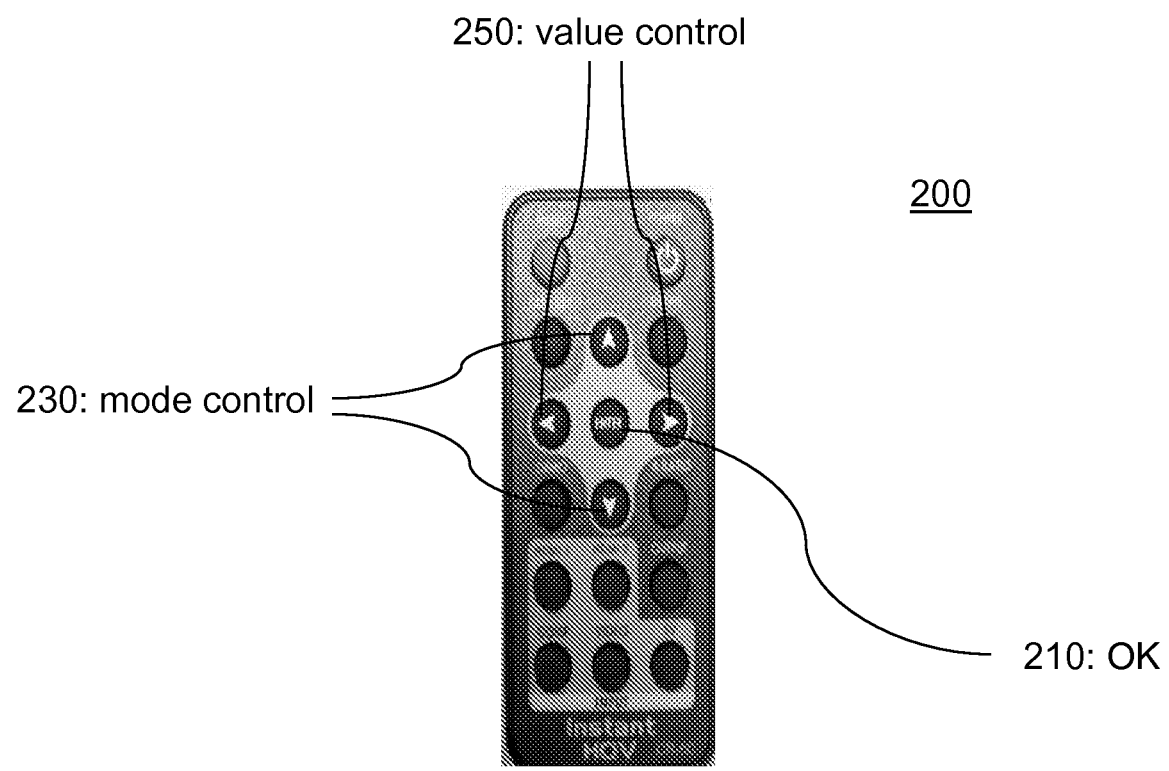
FIG. 2 shows an example of a 2D-to-3D image adjustment controller.

FIG. 2 shows an example of a 2D-to-3D image adjustment controller 200 that can be used to adjust these settings. The controller 200 is shown as an infrared remote controller that may communicate with an infrared receiver at the 2D-to-3D converter 150. Of course, other wired or wireless communication technologies (such as Ethernet, USB, Bluetooth®, or WiFi®) may be used to adjust various 3D image settings such as brightness, depth, contrast, and focus. As shown, two mode control buttons 230 (e.g., up arrow key and down arrow key) that control selection of a current mode that can be adjusted. The modes described in detail will be: brightness, depth, contrast, and focus. Other modes that affect 3D image quality will be described later and may additionally or alternately be selected using the 2D-to-3D image adjustment controller 200 depending on implementation. In this embodiment, the modes are arranged in a circular (or modulo) fashion so that after pressing the down arrow key to reach the "last" mode, a further press of the down arrow key will return to the "first" mode.

Also shown are two value control buttons 250 (e.g., left arrow key and right arrow key) that control adjustments to a current value of the currently-selected mode. An OK button 210 (e.g., ENTER key) is used to confirm or verify a particular value adjustment to a selected mode and also may be used to confirm all the 3D image settings selected by a user.

Figure 3:
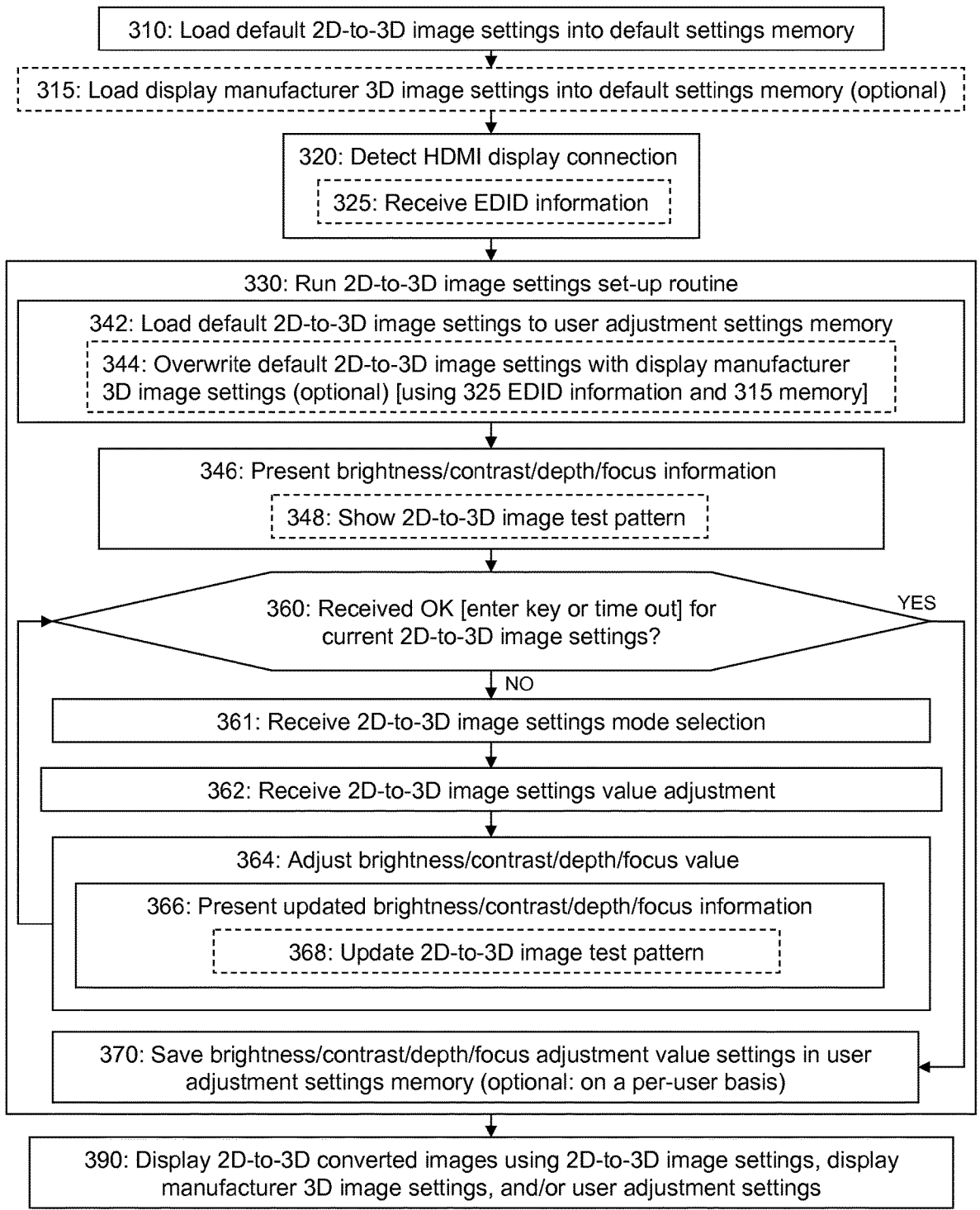
FIG. 3 shows a flow diagram of a 2D-to-3D image adjustment methodology.

FIG. 3 shows a flow diagram 300 of a 2D-to-3D image adjustment methodology.

Initially, the method loads 310 default 2D-to-3D image settings into a default settings memory at the 2D-to-3D converter 150. Depending on the algorithm used to artificially generate a 3D image from a 2D video, a default brightness setting may be 40 (out of a maximum brightness of 90 and a minimum brightness of 0), a default depth setting may be 44 (out of maximum depth of 100 and a minimum depth of 0 [with 0 representing no 3D depth]), a default contrast setting may be 100 (out of a maximum contrast of 100 and minimum contrast of 0), and a default focus setting may be 95 (out of a maximum focus of 100 and a minimum focus of 0 [with 0 representing all of the scene being in front of the plane of the 3DTV screen]).

A summary of brightness, depth, contrast, focus, plus additional image modes, and default their values, are briefly described below, and any one or more of these modes may be adjusted by a user to suit personal preference.

| Mode No. | Mode (can be selected by using up arrow and down arrow on the remote control) | Values (can be modified by using left arrow and right arrow on the remote control) |
|---|---|---|
| 1. | OUTPUT VIDEO FORMAT | PT (Pass Through - default start up mode) 3D LI (Line Interleaved) 3D TB (Top and Bottom) 3D SS (Side by Side) 2D (may be used in future to convert 3D to 2D) A user can toggle through them by pressing the left arrow and right arrow on the remote control. One can go from PT to 3D LI using left arrow key. Pressing left arrow key again will take you to 3D TB or pressing right arrow key will take you back to PT. Remember to set the 3D TV in the same mode as selected on the 2D-to-3D converter 150 (e.g. TB or SS etc.). The 2D-to-3D converter 150 supports HDMI 1.4a signaling also. So, if the 3D TV 190 is set in "3D Auto" mode, the 2D-to-3D converter 150 and the 3D TV 190 will automatically synchronize the formats. |
| 2. | FOCUS | This controls which part of the scene goes inside the 3DTV 190 display plane and which part pops out of the 3DTV display plane. Default value is 95% which implies that starting from the top edge of the screen, 95% of the scene is inside the TV screen. It can be increased or decreased in steps of 2%. Range is 0-100%. |
| 3. | DEPTH | This controls the amount of 3D depth provided in the scene. Default value is 44%. Can be increased or decreased in steps of 2%. Range is 0-100% (0% means no 3D depth) |
| 4. | VIEW MODE (LEFT and RIGHT EYE LOCATION) | LR ↔ RL This mode allows a user to toggle whether Left eye view is on the left side or the right side of the image for the Side by Side mode. Or, on the top or bottom for the Top/Bottom mode. Sometimes, the way some of the 3D TVs work, the left and right eye views need to be swapped. It is important to have this setting done correctly; otherwise it can create severe eye fatigue. Default is left eye view is on the left side for SS (or on top for TB) |

-continued

| Mode No. | Mode (can be selected by using up arrow and down arrow on the remote control) | Values (can be modified by using left arrow and right arrow on the remote control) |
|---|---|---|
| 5. | AUDIO DELAY | In ms. Default value is no delay. In the current implementation of the algorithms this should not cause any lip-synch problem. This mode will be turned on in future when more sophisticated processing is done that delays the video relative to the audio. |
| 6. | HQV MODE (To be used for Noise reduction, scaling and color space conversion) | It is currently turned off. |
| 7. | DETAIL ENHANCEMENT | It is currently turned off. |
| 8. | OUTPUT RESOLUTION | Default: will follow input resolution except for interlaced format; for interlaced format it will convert them to progressive modes. (Highly recommended to leave this in the Default mode.) |
| 9. | BRIGHTNESS | Default to 0 in 2D or Pass Through (PT) modes and 40 in 3D modes. Can be increased/decreased in steps of 10. Range (0-90). Controls the brightness of the scene. For some 3DTV displays, as a 3DTV display goes into the 3D mode the brightness gets reduced significantly. This will allow the user to compensate for that. |

Optionally the method may load 315 display manufacturer 3D image settings into the default settings memory. Different 3DTV display manufacturers may have preset 3DTV picture options with settings for brightness, contrast, color saturation, and sharpness. Generally speaking, the display manufacturer 3D image settings and 2D-to-3D image settings may both reside in the default settings memory. Both loading 310, 315 steps may occur during the manufacture of the 2D-to-3D converter 150. Alternately, the initial loading 310 may occur during manufacture of the 2D-to-3D converter 150 and the optional loading 315 may occur at a later time (e.g., through a Bluetooth® or USB upload).

When the 3DTV 190 is coupled to the output of the 2D-to-3D converter 150, the method detects 320 the HDMI display connection. Optionally, the 2D-to-3D converter may receive 325 Extended Display Identification Data (EDID) information from the 3DTV 190.

After the 2D-to-3D converter 150 detects a coupled 3DTV 190, the method runs 330 a 2D-to-3D image settings set-up routine. The routine loads 342 default 2D-to-3D image settings from the default settings memory to a user adjustment settings memory. The user adjustment settings memory may have a different record for each individual user who runs 330 the 2D-to-3D image settings set-up routine. If applicable, the routine overwrites 344 particular default 2D-to-3D image settings with corresponding display manufacturer 3D image settings. This can be done by using EDID information (from step 325) to select appropriate display manufacturer 3D image settings from the default settings memory and loading those display manufacturer 3D image settings into the user adjustment settings memory in the appropriate fields. Thus, for example, the default 2D-to-3D image setting for brightness may be 40 and the display manufacturer 3D image setting for brightness may be 50 (or +10). Thus, the brightness value in the user adjustment settings memory would be 50 after the completion of steps 342, 344.

Next, the method presents 346 the settings values that have been loaded in the user adjustment settings memory. To ease the set-up process, the setting values may be displayed in numerical fashion, using bars, using pie charts, and/or using other graphical methods. Additionally or alternatively, audio annunciation or tactile (haptic) annunciation may be used. One mode may be presented at a time using LEDs and/or LCDs at the 2D-to-3D converter 150 or via a set-up routine video signal from the 2D-to-3D converter 150 to the 3DTV 190. Because a viewer's overall image perception may be affected by interaction among several settings values, some implementations present more than one mode's values simultaneously at the converter 150 or the 3DTV 190. Optionally, the method may show 348 a 2D-to-3D image test pattern having the settings shown. A simple pattern could be a 2D-to-3D conversion of two rotating cubes with stationary axes of rotation and one cube being "above" the other cube in the scene.

At this point, the method 300 is ready to accept user feedback via the 2D-to-3D image adjustment controller 200. The method checks 360 whether the 2D-to-3D converter 150 has received an OK signal for the current 2D-to-3D image settings. In an embodiment, the OK signal is the result of a user pressing the ENTER key 210 of the controller 200. The OK may be received from the controller 200 directly via an infrared receiver or another type of wired or wireless communication medium. Alternately, the controller 200 may communicate an OK signal to another device (e.g., the 3DTV 190 or the source 110) which then relays the OK signal to the 2D-to-3D converter 150. Alternately, the OK may be implied if no feedback has been received from the 2D-to-3D image adjustment controller 200 for a predetermined amount of time. In other words, if a preset time-out period has elapsed since the settings information was initially presented 346, the converter 150 assumes an OK signal was received 360.

If the OK signal was received either explicitly or implicitly, the method saves 370 the current settings values in a user adjustment settings memory for the 2D-to-3D converter 150. (Note that the user adjustment settings memory may be distributed and inside another physical device.) If there is an active user identifier (e.g., the 2D-to-3D converter 150 is aware that a user has logged onto the source 110, the converter 150, or the display 190), the user identifier may be used to index the stored record of image adjustment settings values. Thus, different users may have different personalized image adjustment settings, which can be accessed and applied when a user logs into the system 100 in the future. Note that the image adjustment settings may be stored as absolute values (e.g., the default settings values as displayed to the user such as 40 brightness, 100 contrast, 44 depth, and 95 focus) or as relative values (e.g., +0 brightness, +0 contrast, +0 depth, and +0 focus—indicating that no changes were made to the default settings values displayed to the user).

If the OK signal was not received, step 361 receives a 2D-to-3D image settings mode selection. This may occur when the user presses a mode control 230 key. Visual or audio feedback may be provided by the converter 150 (e.g., using an LED and/or LCD display or using the 3DTV display) to highlight or otherwise display or annunciate the selected settings mode. Then, the converter 150 receives 362 a 2D-to-3D image settings value adjustment. This may occur when the user presses a value control 250 key. For example, the number of the settings values may be incremented when the right arrow key is pressed and the number of the settings value may be decremented when the left arrow key is pressed.

The converter 150 then adjusts 364 the value of the selected mode and presents 366 an updated set of settings values. Visual presentation 366 may be provided using the LED and/or LCD display of the converter 150 or the 3DTV 190 display. Alternately or additionally, audio or haptic presentation may be used. Optionally, the 2D-to-3D image test pattern may be updated 368 using the updated settings values. As mentioned previously, the image settings may appear to interact with each other and thus a change in brightness value may affect the user's perception of depth, focus, and/or contrast. Thus, step 364 feeds back to step 360 to allow the user to make further value adjustments to any of the available modes. When the user is satisfied with the image quality, step 360 would determine that an OK signal was received and proceed to save 370 the adjustment value settings in the user adjustment settings memory. As previously mentioned, the image adjustment settings may be stored as absolute values (e.g., the updated settings values as displayed to the user such as 50 brightness, 100 contrast, 60 depth, and 89 focus) or as relative values (e.g., +10 brightness, +0 contrast, +16 depth, and −6 focus) indicating that a change was made to at least one of the default settings values previously presented 346 to the user.

Now the 2D-to-3D image settings set-up routine is complete. The method then displays 390 2D-to-3D converted images using the default 2D-to-3D image settings, the manufacturer 3D image settings, and/or the user adjustment settings. If the user adjustment settings are stored as absolute values, then the display 390 only needs to access the user adjustment settings to customize the image quality. If the user adjustment settings are stored as relative values, then at least the default 2D-to-3D image settings need to be retrieved as a base-line and possibly the manufacturer 3D image settings also need to be retrieved to adjust the base-line prior to the final user adjustment settings being applied.

Note that when 2D images are displayed on the 3DTV 190, the user adjustment settings (which were tailored for use with 2D-to-3D converted video), are not applied. When the images displayed are 2D-to-3D converted images, the user adjustment settings are applied. In some implementations, a user may also choose to apply some of the user adjustment settings to natively 3D (non-converted) images or to 2D-to-3D images that were converted at a studio or head-end. Also, if the 2D source video has a high motion content sequence, the 2D-to-3D converter 150 may generate less depth information and gradually introduce more depth information (in concert with the user adjustment settings) as the image become more static.

This method 300 may recur whenever a 3DTV 190 is attached to the 2D-to-3D converter 150. Thus, a user may move the 2D-to-3D converter to work with a different 3DTV display (possibly a different manufacturer or product) and optimize the image settings to the new 3DTV display and the user's preferences. Additionally, this method 300 may recur when a different user logs into the system 100, which allows individuals to create their own image settings. Also, this method 300 may be manually requested by a user at any time. Thus, if a user becomes dissatisfied with the current image settings (either default or personalized), the user can adjust them and store the adjustments.

It has been assumed that the default settings memory and the user adjustment settings memory reside inside the 2D-to-3D converter. FIG. 4 shows a schematic diagram 400 of such a 2D-to-3D converter. Note, however, that this embodiment may be adjusted to place any component in one or more devices (such as the source 110 or display 190) that have a communication connection to the other components.

An HDMI input connector 405 and HDMI receiver 410 of the 2D-to-3D converter 150 are designed receive a 2D video signal from a 2D source 110 via a first HDMI connector 130. Of course, other components may be substituted to receive a 2D video signal such as a wireless HDMI receiver. A data signal may be coupled from the HDMI input connector 405 to a bus switch 413 and a display data channel (DDC) electrically erasable programmable read-only memory (EEPROM) 416. A clock signal may be coupled from the HDMI input connector 405 to the DDC EEPROM 416.

The 2D video signal from the HDMI receiver 410 is sent to a de-interlacer 420 that de-interlaces the 2D video signal. The de-interlaced 2D video signal is sent to an FPGA 430 or alternate component to analyze the color patterns in a 2D video scene as well as position and motion characteristics of objects in the 2D video scene to create stereoscopic 3D scenes.

The user adjustment settings (from method 300) are applied to the 3D views to provide custom image adjustments for a particular viewer. The customized 3D video signal is sent to an HDMI transmitter 490 with an HDMI output connector 495. As mentioned earlier, the wired, HDMI-formatted output may be replaced with a different wired or wireless format. A power supply unit 450 is also contemplated for the 2D-to-3D converter 150.

A microcontroller 460 may control the HDMI receiver 410, the de-interlacer 420, the FPGA 430, the HDMI transmitter 490, and a series of buses 440 and programmable devices (e.g., EEPROMs) as well as a Joint Test Action Group (JTAG) 10-pin header 432, a serial configuration device 436, and/or a 64-bit 200 MHz Double Data Rate [$2^{nd}$ Generation] (DDR2) synchronous dynamic random-access memory (SDRAM) 438. Additional or alternate buses, ports, and memory components may also be controlled by the microcontroller 460.

In this embodiment, the microcontroller 460 has an associated non-volatile memory 470 that stores default settings 473 (see FIG. 3 steps 310, 315) and user adjustment settings 476 (see FIG. 3 step 370). The non-volatile memory 470 also stores a 2D-to-3D image settings set-up program that may instruct the 2D-to-3D converter 150 to perform the method 300 described with respect to FIG. 3. The microcontroller 460 may be coupled to various output components such as a Bluetooth® transceiver 480, a USB connector 485, LED or LCD displays 487, and/or the HDMI receiver 410, FPGA 430, and HDMI transmitter 490 to provide default and adjusted image settings values information to a user in a visual, audible, tactile, or other format. The microcontroller 460 may also be coupled to various input components such as the Bluetooth® transceiver 480, an infrared receiver 483, the USB connector 485, and/or the HDMI receiver 410, FPGA 430, and HDMI transmitter 490 to receive image settings adjustment instructions from a user.

In this manner, a method and apparatus for 3DTV image adjustment may be used to personalize image settings for an individual viewer. User adjustment settings are obtained and saved so that, in the future, the user's preferred image settings will be used when viewing 2D-to-3D video.

While this disclosure includes what are considered presently to be the embodiments and best modes of the invention described in a manner that establishes possession thereof by the inventors and that enables those of ordinary skill in the art to make and use the invention, it will be understood and appreciated that there are many equivalents to the embodiments disclosed herein and that modifications and variations may be made without departing from the scope and spirit of the invention, which are to be limited not by the embodiments but by the appended claims, including any amendments made during the pendency of this application and all equivalents of those claims as issued. Accordingly, the specification and figures are to be regarded in an illustrative rather than a restrictive sense, and all such modifications are intended to be included within the scope of present teachings.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

As understood by those in the art, microcontroller 460 includes a processor that executes computer program code to implement the methods described herein. Embodiments include computer program code containing instructions embodied in tangible media, such as floppy diskettes, CD-ROMs, hard drives, or any other computer-readable storage medium, wherein, when the computer program code is loaded into and executed by a processor, the processor becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

What is claimed is:

1. A method for three-dimensional image depth control, comprising:
    converting a two-dimensional image (2D image) to a first three-dimensional image (3D image) based on a first 2D-to-3D depth value, wherein the first 2D-to-3D depth value represents an amount of perceived 3D depth provided in image frames converted from 2D video signals to 3D video signals;
    causing the 3D image to be presented;
    causing the first 2D-to-3D depth value to be presented;
    receiving one or more user instructions to set a second 2D-to-3D depth value that is different than the first 2D-to-3D depth value;
    causing the second 2D-to-3D depth value to be presented;
    converting the 2D image to a second 3D image based on the second 2D-to-3D depth value;
    causing the second 3D image to be presented;
    receiving one or more user instructions to save the second 2D-to-3D depth value;
    in response to the user instructions, saving the second 2D-to-3D depth value;
    receiving a 2D video signal from a 2D video source;
    converting the 2D video signal to a 3D video signal based on the second 2D-to-3D depth value; and
    causing at least a portion of the 3D video signal to be presented.

2. The method of claim 1, wherein the 2D image is a 2D-to-3D test pattern.

3. The method of claim 1, wherein the first 2D-to-3D depth value is a manufacturer default 3D depth value.

4. The method of claim 1, further comprising receiving Extended Display Identification Data (EDID) information from a display device, wherein the EDID information indicates that the display device is a 3D display device.

5. The method of claim 4, wherein the EDID information includes a default 3D depth value.

6. The method of claim 5, further comprising detecting a connection to the 3D display device, wherein converting the 2D image to the first 3D image is performed in response to detecting the connection to the 3D display device.

7. A system for three-dimensional image depth control, comprising:
    a processor that is programmed to:
    convert a two-dimensional image (2D image) to a first three-dimensional image (3D image) based on a first 2D-to-3D depth value, wherein the first 2D-to-3D depth value represents an amount of perceived 3D depth provided in image frames converted from 2D video signals to 3D video signals;
    cause the 3D image to be presented;
    cause the first 2D-to-3D depth value to be presented;
    receive one or more user instructions to set a second 2D-to-3D depth value that is different than the first 2D-to-3D depth value;
    cause the second 2D-to-3D depth value to be presented;
    convert the 2D image to a second 3D image based on the second 2D-to-3D depth value;
    cause the second 3D image to be presented;

receive one or more user instructions to save the second 2D-to-3D depth value;
in response to the user instructions, save the second 2D-to-3D depth value;
receive a 2D video signal from a 2D video source;
convert the 2D video signal to a 3D video signal based on the second 2D-to-3D depth value; and
cause at least a portion of the 3D video signal to be presented.

8. The system of claim 7, wherein the 2D image is a 2D-to-3D test pattern.

9. The system of claim 7, wherein the first 2D-to-3D depth value is a manufacturer default 3D depth value.

10. The system of claim 7, wherein the processor is further programmed to receive Extended Display Identification Data (EDID) information from a display device, wherein the EDID information indicates that the display device is a 3D display device.

11. The system of claim 10, wherein the EDID information includes a default 3D depth value.

12. The system of claim 11, wherein the processor is further programmed to detect a connection to the 3D display device, wherein the processor converts the 2D image to the first 3D image is performed in response to detecting the connection to the 3D display device.

13. A non-transitory computer-readable medium containing computer executable instructions that, when executed by a processor, cause the processor to perform a method for three-dimensional image depth control, the method comprising:
converting a two-dimensional image (2D image) to a first three-dimensional image (3D image) based on a first 2D-to-3D depth value, wherein the first 2D-to-3D depth value represents an amount of perceived 3D depth provided in image frames converted from 2D video signals to 3D video signals;
causing the 3D image to be presented;
causing the first 2D-to-3D depth value to be presented;
receiving one or more user instructions to set a second 2D-to-3D depth value that is different than the first 2D-to-3D depth value;
causing the second 2D-to-3D depth value to be presented;
converting the 2D image to a second 3D image based on the second 2D-to-3D depth value;
causing the second 3D image to be presented;
receiving one or more user instructions to save the second 2D-to-3D depth value;
in response to the user instructions, saving the second 2D-to-3D depth value;
receiving a 2D video signal from a 2D video source;
converting the 2D video signal to a 3D video signal based on the second 2D-to-3D depth value; and
causing at least a portion of the 3D video signal to be presented.

14. The non-transitory computer-readable medium of claim 13, wherein the 2D image is a 2D-to-3D test pattern.

15. The non-transitory computer-readable medium of claim 13, wherein the first 2D-to-3D depth value is a manufacturer default 3D depth value.

16. The non-transitory computer-readable medium of claim 13, wherein the method further comprises receiving Extended Display Identification Data (EDID) information from a display device, wherein the EDID information indicates that the display device is a 3D display device.

17. The non-transitory computer-readable medium of claim 16, wherein the EDID information includes a default 3D depth value.

18. The non-transitory computer-readable medium of claim 17, wherein the method further comprises detecting a connection to a 3D display device, wherein converting the 2D image to the first 3D image is performed in response to detecting the connection to the 3D display device.

* * * * *